United States Patent [19]

Hong et al.

[11] Patent Number: 4,751,093

[45] Date of Patent: * Jun. 14, 1988

[54] PREPARATION OF FRIED POTATO PIECES

[76] Inventors: Leon Hong, 29 Cottage Ct., Freeport, N.Y. 11520; John J. Balboni, Nash Rd., Purdys, N.Y. 10578

[*] Notice: The portion of the term of this patent subsequent to May 8, 2001 has been disclaimed.

[21] Appl. No.: 918,630

[22] Filed: Oct. 14, 1986

Related U.S. Application Data

[63] Continuation of Ser. No. 666,483, Oct. 30, 1984, abandoned, which is a continuation-in-part of Ser. No. 493,637, May 11, 1983, abandoned, and a continuation-in-part of Ser. No. 493,636, May 11, 1983, abandoned, and a continuation-in-part of Ser. No. 521,701, Aug. 8, 1983, abandoned, and a continuation-in-part of Ser. No. 521,174, Aug. 8, 1983, abandoned, and a continuation-in-part of Ser. No. 521,521, Aug. 9, 1983, abandoned, and a continuation-in-part of Ser. No. 527,963, Aug. 31, 1983, abandoned, and a continuation-in-part of Ser. No. 589,437, Mar. 14, 1984, abandoned, each and a continuation-in-part of Ser. No. 475,523, Mar. 15, 1983, U.S. Pat. No. 4,447,459.

[51] Int. Cl.4 ............................................. A23L 1/217
[52] U.S. Cl. .................................... 426/438; 426/144; 426/637; 426/808
[58] Field of Search ............... 426/144, 639, 438, 441, 426/444, 456, 465, 472, 473, 482, 483, 518, 808, 281, 506, 509, 510

[56] References Cited

U.S. PATENT DOCUMENTS

| | | | |
|---|---|---|---|
| 1,025,373 | 5/1912 | Cooke | 426/637 |
| 1,506,033 | 8/1924 | Trescott | 426/456 |
| 2,448,152 | 8/1948 | Patton | 426/438 X |
| 2,676,889 | 4/1954 | Keenan | 426/637 X |
| 3,391,005 | 7/1968 | Babigan | 426/637 X |
| 3,397,993 | 8/1968 | Strong | 426/441 |
| 3,518,097 | 6/1970 | Menzi et al. | 426/438 X |
| 3,623,893 | 11/1971 | Mauge | 426/281 |
| 3,835,222 | 9/1974 | Wisdom et al. | 426/438 X |
| 3,881,028 | 4/1975 | Capossela et al. | 426/637 X |
| 4,254,153 | 3/1981 | Ross et al. | 426/637 X |
| 4,272,554 | 6/1981 | Schroeder et al. | 426/637 X |
| 4,317,842 | 3/1982 | El-Hag et al. | 426/438 X |
| 4,447,459 | 5/1984 | Balboni et al. | 426/637 X |

Primary Examiner—Arthur L. Corbin
Attorney, Agent, or Firm—Thaddius J. Carvis

[57] ABSTRACT

The object of the invention is to enable the preparation of fried potato products with improved texture and texture stability.

Potato pieces, such as strip-shaped French fries or disc-shaped dinner fries, have better inner and outer textures and retain a desirable textural contrast between the two longer after finish frying where the surface of the potato pieces is disrupted, preferably in combination with a blanching step and most preferably when done after a surface skin has been formed by air drying or par frying. Improvements are also seen where the pieces are blanched sufficiently to substantially completely gelatinize the potato starch and preferably are infused with low molecular weight soluble solids and then washed sufficiently to remove some of the soluble solids. The soluble solids, such as sodium chloride, within the potato pieces help to hold moisture internally of the pieces and to retard its exit through the crisp surface skin formed by frying. Infusions can be accomplished during blanching or thereafter.

Also disclosed is the preparation of fried potato products which can be quickly heated for consumption in conventional home ovens. According to this aspect of the invention, the potato pieces are substantially fully cooked prior to freezing. The crispness of these products is enhanced by the surface disruption, blanching and infusion aspects of the invention.

3 Claims, 2 Drawing Sheets

PREPARATION OF FRIED POTATO PIECES

RELATED APPLICATIONS

This is a continuation of co-pending application Ser. No. 666,483 filed on Oct. 30, 1984, which is a continuation-in-part of the following copending U.S. Patent applications: Ser. Nos. 493,637 filed on May 11, 1983; 493,636 filed on May 11, 1983; 521,701 filed on Aug. 8, 1983; 521,174 filed on Aug. 8, 1983; 521,521 filed on Aug. 9, 1983; 527,963 filed on Aug. 31, 1983; 589,437 filed on Mar. 14, 1984; all of which are now abandoned and are continuations-in-part of U.S. Ser. No. 475,523 filed on Mar. 15, 1983, now U.S. Pat. No. 4,447,459.

TECHNICAL FIELD

The present invention relates to fried potatoes, and particularly to improved processing which produces fried potatoes which exhibit improved texture, both internally and externally, whether prepared for serving by finish frying or oven heating.

Potatoes have long been a staple in the diets of most Western countries. Among the many popular ways in which potatoes are served are the various fat-fried forms, such as french fries, which are typically elongated, generally-square strips of potatoes, and dinner fries, which are typically flat sections such as sliced perpendicular to the long axis of the potato. These products, as well as other types of fried potato pieces, have become increasingly popular in recent years.

Advances in potato processing technology have enabled the mass marketing of frozen products which can be easily prepared into fresh-tasting products at home or in restaurants. Unfortunately, these fried potatoes typically lose their crispness within minutes of frying -- often requiring that they be discarded prior to consumption so as not to displease diners who associate crispness with quality. Moreover, the internal texture is typically drier and less appealing than freshly prepared products. Color is also associated with quality and is difficult to control.

There is a present need for processing improvements which would enable improving texture and texture retention for fried potato products for longer periods of time, especially while improving color, flavor, and ease of final preparation.

BACKGROUND ART

U.S. Pat. No. 3,397,993 to Strong is directed to a process for preparing frozen french fried potato segments which is said to enable the preparation of a final product, after a short finish fry, that closely simulates french fried potatoes prepared from fresh potatoes. According to the disclosure, potatoes are initially peeled, trimmed, cut into segments and washed. The individual segments are then blanched in hot water or steam until they become translucent but without blanching substantially beyond translucency. The disclosure points out that the sloughing of solids evidences overblanching. The blanched potato segments are then dehydrated for a product weight loss of about 20 to about 30% of their initial weight, immersed in a deep-fat fryer for from about 15 to about 60 seconds and are then frozen.

Strong indicates that, even after long periods of storage, the frozen potato segments can be finish fried rapidly to produce french fried potato strips of high quality, substantially identical to french fries produced from raw, unfrozen potatoes. Unfortunately, it has been our experience that french fried potatoes, whether prepared in the manner suggested by Strong, or from raw, unfrozen potatoes, lose their desired crispness after a relatively short period of time and become undesirably soggy.

During peak periods in high-volume fast-food restaurants, crispness retention can be controlled adequately by good management of the rate at which the french fries are finally fried. However, the best management plan requires close supervision and, even then, is susceptible to breakdown. Moreover, during periods of less than peak demand, the internal moisture within the previously fried fries is given sufficient time to migrate into the crisp outer surface of the fries to render them soggy. Thus, the restaurateurs' desire to meet immediate demands for crisp french fries must be tempered by the practical consideration of unacceptably high levels of products which must be discarded. And, diners who choose to take out their orders often end up with french fries which have lost their crispness.

Wilder, in U.S. Pat. No. 3,649,305 also discloses a process which is said to enable the preparation of frozen french fried potatoes which, when finish fried by the final user or retailer, will closely simulate french fried potatoes prepared from fresh potatoes in color, texture, flavor and odor. According to the disclosure, the potatoes are first peeled, trimmed, cut into french fry size strips and washed. The strips are then immersed in a water solution containing a commercially acceptable discoloration-inhibitor, dehydrated without prior blanching to reduce the weight by from about 10 to about 30%, and then blanched for 7½ minutes. After blanching, the strips are then par-fried and frozen. While improvement in color retention is asserted, there is no indication that the product produced by Wilder has better texture initially or retains it any longer than french fried potatoes prepared from freshly-cut, raw potatoes.

Canadian Patent No. 900,266 to Saunders discloses a process which is again said to result in a finally fried product which simulates in color, quality, texture, flavor and taste, french fried potatoes prepared directly from fresh potatoes. Saunders discloses the conventional preliminary steps, including sugar adjustment for color control. No blanching is disclosed, but in two examples the pieces are dipped in heated (170°-180° F.) treatment solutions for about 1 minute. Thereafter the strips are partially fried to reduce the weight of the strips by about 20% prior to a dehydration step which results in a further weight reduction of from about 5 to about 20%. Following dehydration, the potato strips are subjected to a second frying step and frozen. Again, no improvement in crispness retention is disclosed.

The problem of retaining crispiness is addressed in U.S. Pat. No. 3,391,005 to Babigan and U.S. Pat. No. 4,254,153 to Ross et al. According to Babigan, a raw potato is cut into elongated strips having a plurality of thin parallel ribs of defined dimensions. These ribs enable the formation of a thicker, crisper crust by virtue of their shape. While Babigan discloses that the product can be frozen, there is no specific disclosure with regard to processing, such as blanching, necessary to prepare a high quality product from his cut raw potato strips.

Ross et al, in U.S. Pat. No. 4,254,153, discloses a process for preparing frozen par-fried potatoes which, when finish fried, are said to have a mealy internal core surrounded by a crisp surface which remains crisp and rigid for extended periods of time after frying. According to the disclosure, potatoes which have been peeled, trimmed, cut into strips and blanched for from 2 to 15 minutes to partially cook the potato pieces (Col. 2, l. 67), are subjected to a two-stage drying procedure. The first drying stage exposes the strips to high velocity ambient air to reduce their weight by about 8 to 15%. The second drying stage subjects the pieces to circulating heated air to further reduce the weight of the strips by an additional 8 to 15%. After drying, potato strips are then maintained in a quiescent state for a short period of time to permit equalization of the moisture distribution in the strips and are then par fried and frozen. According to Example 1, a 7-8 minute blanch at 181° F. is followed by the two-stage drying procedure which takes a total of about 27 minutes, thus greatly increasing processing time from that which is conventional.

In U.S. Pat. No. 3,881,028 to Capossela, Jr. et al, there is disclosed a process for preparing a rehydrateable deep-fat fried potato product. According to this disclosure, potato pieces are preliminarily processed in conventional fashion, including blanching for 1 minute, and then heated by microwave energy to partially gelatinize the starch therein prior to deep-fat frying and heating to effect dehydration. The treated pieces are said to be shelf-stable without refrigeration and can be rehydrated by soaking in water and heating. Capossela Jr. et al disclose that it is possible to provide a crispier shell on the product if, after blanching and quenching in cold water, the potato pieces are soaked in a sodium chloride solution heated to about 180° F., followed by washing again with cold water. There is no indication given by Capossela as to the effect of this cold-water-quenching/hot-salt-water/soaking/cold-water-quenching on product color. In any event, the teachings are not directed to a frozen, par-fried potato product and inherently produce a product which is less crisp than even products prepared from freshly-cut raw potatoes.

Similarly, U.S. Pat. No. 3,518,097 to Menzi is directed to dehydrated french fried potatoes. The disclosure states that a potato is fully cooked and then freeze-dried. Several techniques are suggested for increasing the drying rate after full frying and freezing. Among these are pressure cycling and puncturing. The resulting products must be rehydrated prior to heating and serving and will lack the textural quality of ordinary french fries.

In U.S. Pat. No. 3,934,046 to Weaver et al, a process is disclosed which is said to enhance texture, maintain flavor, and prevent darkening of fried potato products. As part of their disclosure, Weaver et al indicate that leaching raw potato pieces with hot water prior to frying has several disadvantages, including serious impairment of texture and flavor. According to their disclosed process, preliminarily prepared raw potato pieces are pre-fried first and then leached by contact with water. Weaver et al disclose that, following the application of these critical steps, the treated pieces may be subjected to any of various procedures, depending upon the final product desired. For preparing french fried potatoes, the examples indicate that the potato strips are frozen for later finish frying or are further fried prior to freezing for final preparation by oven baking.

There is a present need for simple and effective process improvement which would enable the preparation of fried, frozen potato products which would provide a moist, tender interior and at the same time retain their crisp outer texture for extended periods of time, especially when coupled with improved color control and efficient use of processing time and energy expenditure. There is a further need for such a process which would enable these desirable attributes to be achieved in frozen products which could be prepared for consumption by heating in a conventional or microwave oven.

DISCLOSURE OF INVENTION

In accordance with the present invention, there are provided improved processes for preparing fried potato products and improved fried potato products.

According to one embodiment of the present invention, a process for preparing par-fried potato pieces comprises: cutting a potato into pieces, blanching the potato pieces and disrupting the outer surface of the potato pieces before or after blanching. The potato pieces can be frozen either before or after disrupting the outer surface of the potato pieces. Preferably, the step of surface disruption is carried out after a surface skin has been formed over the potato pieces by par-frying or air drying.

According to a preferred aspect of the invention, the crispness of fried potato pieces, prepared from potato pieces which have been heated sufficiently to inactivate enzyme activity and partially dehydrate the pieces, par-fried sufficiently to form a surface skin and frozen, is improved by disrupting the surface skin after par-frying, but prior to finish frying.

Also provided according to the present invention is a frozen, par-fried potato product comprising discrete pieces of potato having a surface skin resulting from frying substantially completely covering the surfaces of the potato pieces but being disrupted at discrete locations to expose the interior of the potato pieces.

According to another aspect of the present invention, a process is provided to achieve crispiness in fried potato pieces adapted for final preparation by the household oven technique which comprises: cutting a potato into pieces, optionally blanching to inactivate enzyme activity, dehydrating partially, optionally par-frying sufficiently to form a surface skin and disrupting the skin, finally frying to achieve a desired final eating texture, and freezing for packaging.

According to yet another aspect of the invention, an improvement in a process for preparing french fried potatoes is provided which provides a moist, tender interior and enhances the crispness of fried potato pieces prepared from potato pieces which have been blanched, partially dehydrated, then par-fried, and frozen, the improvement comprising: blanching sufficiently to substantially completely gelatinize the starch in the potato pieces, and preferably infusing in an aqueous solution of low-molecular weight soluble solids under conditions of time, temperature and solids concentration to infuse the potato pieces with the soluble solids, followed by washing the potato pieces in water under conditions effective to remove from the surface and below it at least a portion of the soluble solids infused within the potato pieces. This infusion/washing sequence aids color control and enhances texture. Preferably, the soluble solids comprise sodium or potassium chloride or other salt of a strong acid. The blanching is preferably brought to just the point of observable sloughing and then stopped. The most preferred products are prepared by further including the step of scoring or otherwise disrupting the surface of the potato pieces, with the best results achieved by scoring after par frying, the next best by scoring after drying, and the next best scoring after blanching. The potato pieces can be prepared for consumption by frying in hot oil or oven heating.

Also provided according to the present invention are potato products prepared according to the process improvements of the invention.

BRIEF DESCRIPTION OF THE DRAWINGS

The present invention will be better understood and its advantages will become more apparent from the following detailed description, especially when read in light of the attached drawings wherein:

FIGS. 1, 3, and 4 show french fry-type pieces and FIGS. 6, 8, and 9 show dinner fry-type pieces;

DETAILED DESCRIPTION OF THE INVENTION

Figure 1:
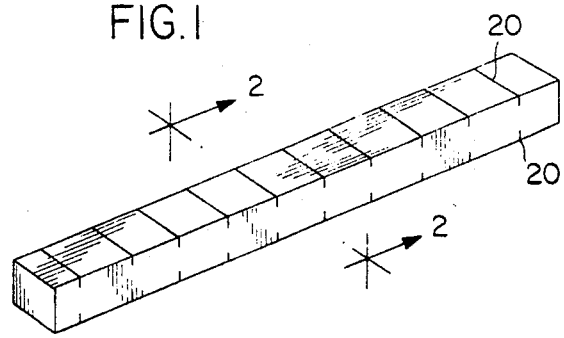
FIGS. 1, 3, 4, 6, 8 and 9 are perspective views of various embodiments of the present invention showing different shapes and configurations in which the surface of the potato pieces can be disrupted.
Figure 2:
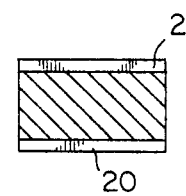
FIG. 2 is a cross-sectional view taken along line 2—2 in FIG. 1.

The present invention can improve the overall eating quality of fried potatoes prepared from white potatoes of any variety—especially to provide a moist, tender interior and a distinct contrast between this and a crisp exterior, the crispness of which continues for extended periods of time. Improved product textures can be achieved for products which are finally prepared for consumption by finish frying or by simply reheating in a conventional or microwave oven.

An essential feature of a preferred embodiment of the invention is that the potato pieces be blanched and the exterior be scored, cut, punctured, or otherwise treated to disrupt the surface to expose the mealy interior. The treatment to disrupt surface is preferably carried out after a parfrying step which forms a skin over the cut surfaces of the potato pieces. This surface disruption can be carried out prior to freezing or on a product not intended for freezing, or it can be accomplished after freezing either prior to packaging or immediately prior to finish frying. It is an advantage of the present invention that commercially-available frozen, par-fried french fries can be processed according to the present invention to improve their crispness retention. Lesser effects can be achieved by scoring or otherwise disrupting the surfaces of the potato pieces if done prior to par-frying, but after air drying or after blanching but before drying. Yet lesser affect is achieved if surface disruption is performed prior to blanching.

The drawings illustrate a number of the many different configurations which the products of this invention can be given by virtue of the surface-disruption step. FIGS. 1-5 show variations of the typical strip-type french fry which is typically cut in long strips to a dimension of from about 3/16 to about ½ inch on a side. FIGS. 6-10 indicate a typical dinner fry potato which can be a cross-sectional slice cut along the axis of the potato to a thickness of from about 3/16 to about ⅜ inch.

Typically, conventionally fried potato products have lost all noticeable crunch, except possibly at over-fried edges or corners, even prior to completion of a meal. Second servings from the original batch are almost always limp and rubbery. This is believed to be due to the natural tendency of the hot, moist, mealy interior of the potato to cause migration of moisture toward the surface skin. The potato products of the present invention, however, remain crisp and noticeably crunchy for extended periods of time, e.g. greater 7 minutes, preferably greater than 15 minutes, and according to the most preferred embodiments for 30 minutes or more, even after being cooled to essentially room temperature.

The frying of potato pieces has a number of effects on the potato. In addition to developing the typical fried potato color and the crispy exterior, it also dehydrates the potato pieces. The dehydration during the preparation of conventional french fries is effected by heating the internal moisture of the potato pieces to create moisture vapor and forcing it through the surface skin formed during par frying. It is believed that the exhaustion of moisture through the surface skin is retarded by the skin to such an extent that an excess amount of water remains within the potato pieces upon removal from the fryer and this moisture continues to push through the surface skin even after frying.

The bulk flow of moisture through the surface skin during frying is believed to establish pathways through the mealy interior of the fry and through the surface skin itself. This would have a number of adverse effects on texture. First, it is believed that the constant passage of moisture through the surface skin during frying prevents the skin from achieving the degree of crispness that it would otherwise have if moisture were not forced therethrough. Secondly, it is believed that the pathways provide the path of least resistance for escaping moisture or simply moisture migration subsequent to frying. Thirdly, it is believed that forcing moisture through the skin in this manner retards dehydration to an extent that frying times are prolonged and final moisture contents remain higher than necessary for optimum internal texture.

According to one aspect of the present invention, however, the surface is disrupted prior to finish frying. It is believed that by disrupting the surface skin formed by par-frying in the preferred embodiment, moisture vapor generated during finish frying is channeled, not through the exterior skin, but directly through the areas of surface disruption. Thus, the surface skin which is being finish fried is not constantly subjected to the passage of moisture vapor therethrough and the pathways for escape of moisture are not fixed in the direction of the surface skin such that moisture would continue to migrate toward the skin even after completion of the finish frying. Additionally, it is believed that the provision of disruptions in the surface skin of the potato pieces provides a better relief valve for built-up pressure to more completely release water vapor generated during finish frying and to leave behind a minimum of moisture.

While it is apparent that the areas of surface disruption develop a surface skin during finish frying, it is our belief that this skin never becomes as solid and impenetrable as the original surface skin. Upon initially placing the product of the invention in hot oil for finish frying, the surface skin formed during air drying or par-frying is relatively impervious to moisture as compared to the areas of surface disruption. This permits this original surface skin to fry to a more impervious structure while moisture is forced through the areas of surface disruption. Even as the skin forms over these areas, moisture continues to flow therethrough in large quantities. This bulk flow of moisture prevents a totally impervious skin to be formed at these areas and accomodates the formation of a crisper, less-pervious skin over the other areas of the potato piece.

Applicants offer these statements by way of a possible explanation for the unexpectedly good results achieved according to the present invention, but do not wish to be bound to this particular theory as there may be other factors influencing the result which may contribute to or produce even greater influence in the achievement of the results. Whatever the reason for the improvements, it remains that the products of the present invention do remain crisp for greater periods of time than products prepared otherwise.

The initial steps in processing the potato can be accomplished in conventional fashion or can include one or more of the other improvements in blanching, infusion and infusion followed by washing as provided according to the present invention. Thus, potatoes are washed and peeled using conventional methods and then cut into strips, discs or other shapes as is desired. The cut potato pieces may then be washed to remove surface starch and/or treated for color control as is conventional in the art. The steps of peeling and washing the cut pieces are optional. Preferably, the color control techniques of the present invention are also employed.

The typical step of blanching calls for heating the potato pieces sufficiently to destroy enzyme activity. The potato pieces are also typically heated to partially dehydrate the potato pieces. This can be conducted in one or more steps. Typically, the blanching and dehydration steps are conducted separately, and the dehydration can be accomplished in a plurality of stages. When the potato products are being prepared for immediate use, neither blanching nor partial dehydration steps are conventionally necessary. To achieve the best results according to the present invention, however, it is essential not only to employ both the blanching and dehydration steps, but to conduct them sequentially, and to conduct the blanching to the extent that the starch is substantially completely gelatinized.

An essential feature of the improved blanching according to the invention is that the potato pieces be blanched sufficiently to substantially completely gelatinize the starch, and preferably that the potato pieces be infused with soluble solids and then washed sufficiently to remove a portion of the soluble solids. This is believed to establish a concentration gradient which not only tends to hold water inside the potato pieces to maintain a soft interior, but to retard its release through the fried surface skin to prevent its adverse effect on surface crispness. This effect is achieved with or without the surface disruption of the potato pieces but is most pronounced in combination with it. The degree of blanching employed according to this invention is considered to be excessive by those skilled in the art but is found to synergistically improve the texture of the interior and increase perceived crispness in the final product when combined with the infusion-washing technique. The achievement of a desirably soft, mealy, moist taste perception for the interior and a desirably crisp exterior, with long term textural contrast, is dramatically unexpected.

Blanching according to this aspect of the invention should be carried out by heating in steam or in hot water for from about 5 to about 15 minutes. The blanching operation should be conducted to an extent not only sufficient to inactivate the enzymes throughout the potato pieces to prevent degradation during frozen storage and to partially cook the potato pieces as is the requirement for prior art blanching procedures, but further to substantially completely gelatinize the starch granules in the potato. Preferably, the blanching will be just to the point of observable sloughing. With experience, the correct times and temperatures can be determined to limit actual sloughing to commercially acceptable levels. When blanched in water, the water temperature will vary from about 180° F. to about boiling. Temperatures can be as low as about 165° F., but are not preferred, because the gelatinization of starch is time and temperature related and the lower temperatures will require longer times. Preferred blanching conditions will cause an increase in moisture of from about 1 to about 10% based upon the weight of potato solids remaining after blanching.

The infusion procedures of the present invention have the advantage that they can be combined with the blanching procedures of the invention to enhance both color and flavor, in addition to their effects on texture. For example, according to one aspect of the infusion step of the present invention, the potatoes can be blanched for conventional periods of time in brine. Typically the brine is prepared by simply adding a suitable low molecular weight soluble solid to the aqueous blanching liquid.

The "soluble solid(s)" employed according to the present invention are low molecular weight materials which are soluble in water and exert strong osmotic pressure effects—that is, they are excellent water binders and move easily into the potato pieces. Preferred soluble solids are the edible sodium and potassium salts of strong acids. Sodium and potassium chloride are especially good, and can be used in combination to good effect. Also suitable are salts with divalent cations such as calcium and salts of organic acids such as citric and ascorbic acids. The infusion step should be conducted under conditions of time, temperature and soluble solids concentrations effective to effect infusion. Typical soluble solids concentrations in the solution range from about 2 to about 20%, and more typically up to about 5%. Typical levels of soluble solids infused into the potato pieces before washing will range from about 0.05 to about 3%. The washing step will decrease the soluble solids concentration, by removing soluble solids principally near the surface and just under it, to achieve an overall concentration of up to about 1%, typically about 0.1 to about 0.9%, or more narrowly, within the range of about 0.2 to about 0.75%. These percentages are by weight, based on the weight of the product at that stage in processing. The final soluble solids concentration will be dependent upon wash time and temperature.

According to another embodiment of infusion according to the present invention, the hot potato pieces resulting from blanching in plain water can be quenched in an aqueous solution of low molecular weight soluble solids under conditions of time, temperature and soluble solid concentration effective to cause migration of the soluble solids into the interior of the potato pieces. The soluble solid migration is achieved due to the combined effects of osmotic pressure and temperature differential between the potato pieces and the brine. The blanched potato pieces will be hot, and the solution, such as brine, will preferably be at a temperature of from about 40° to about 80° F., but as high as 150° F. has been employed with no adverse effect.

After blanching in the solution of soluble solids or quenching in it, the potato pieces are then washed in cool water under conditions effective to withdraw soluble solids from the potato pieces. The washing following the blanching or quenching in the aqueous solutin of soluble solids is effective to create a concentration gradient within the potato pieces, with the lowest concentration of soluble solids near the surfaces of the potato pieces, which tends to draw moisture into the interior of the potato pieces and hold it there and, further, retards its egress through the fried surface skin, thus preventing it from becoming soggy. The concentration of the soluble solids, specifically for NaCl is optimized around 0.1% to 0.75% or 0.9%.

The blanched/infused/washed potato pieces are then typically air dried in one or a plurality of stages. Typically, the drying air will be at a temperature of from about 125° to about 200° F. The temperature of the air, its relative humidity, and its rate of flow past the potato pieces will be controlled in known manner to achieve rapid drying without prematurely creating a tough skin on the potato pieces. Such a skin tends to decrease the rate of drying and results in excessive chewiness in the finished product. The weight loss during the dehydration step can amount to up to about 35% of the original weight of the potato pieces, but will preferably be controlled to within the range of from about 5 to about 20%. Most preferably, the air drying will be conducted at a temperature of from about 170° to about 180° F. for a time sufficient to achieve a weight loss of about 15%, which is considered the optimum.

Following dehydration, the potato pieces can then be par-fried in hot oil. If desired, this par-frying step can also be employed to achieve a moderate degree of dehydration, although this is not the preferred manner of operation. The par-frying will typically be conducted for a period of time of from about 30 seconds to about 6 minutes at a temperature within the range of from about 325° to about 400° F. Preferably, where the product is to be prepared for final consumption by finish frying in hot oil for a conventional period of time, the par-frying will be conducted at a temperature of from about 340° to about 365° F. for from about 1 minute to about 3 minutes. Where, on the other hand, final preparation is to be by an abbreviated oil fry or oven heating just sufficient in duration to heat the product and finally crispen the surface, the frying step will be of longer duration within the above range to produce an essentially fully-cooked product.

The most preferred products of the invention will be prepared by a process which further includes the surface disruption step described in more detail below. The combined effect of these techniques is extremely good. Most preferably the surface disruption is accomplished after par-frying, it having been observed that the product crispness retention is improved as the disruption step is done at the latest time in the process before final frying. Thus, while surface disruption can be accomplished before or after blanching or after air drying, the results are not as pronounced as when done later.

When desired for the best effect according to the invention, the potato pieces are processed in any suitable manner to disrupt the surface, and preferably a surface skin which has been formed by drying or par-frying. This surface disruption can be accomplished, for example, by cutting with a blade, puncturing with needle-like projections, abrading lightly with a coarse abrasive surface, or simply removing the potato peel, which could be intentionally left on a portion of the potato pieces, such as sliced dinner fries, through the par-frying step.

The exact degree of surface disruption necessary to achieve the advantages of the present invention cannot be quantified by any universally exact numerical description. However, guided by the specific examples of the invention set forth in the drawings and in the specific operating examples set forth below, it can be seen that a wide variety of degrees and types of scoring can be employed to achieve the objects of the invention. For french fried potatoes of the type shown in FIG. 1 and dinner fry potatoes of the type shown in FIG. 6, the surface is slit with a knife means just sufficiently to fully penetrate the surface skin. These surface slits are shown as parallel cuts 20 which are preferably spaced from about ⅛ inch to about ½ inch apart.

Figure 3:
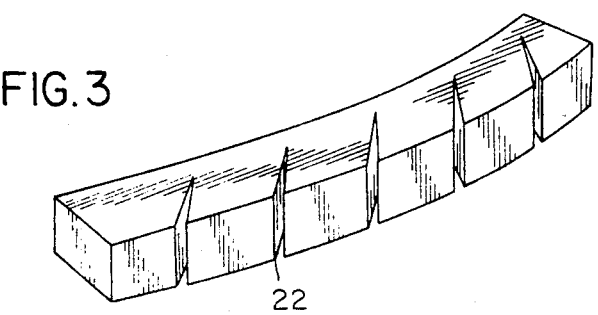
Figure 4:
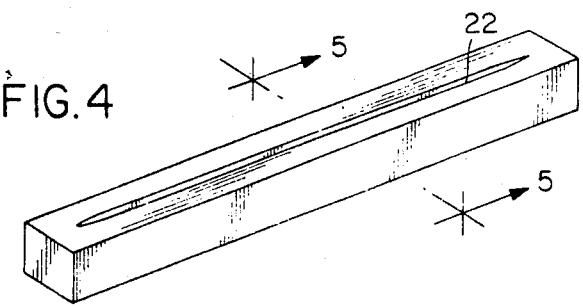
Figure 5:
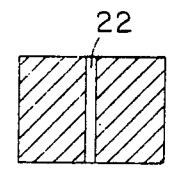
FIG. 5 is a cross-sectional view taken along line 5—5 in FIG. 4.
Figure 6:
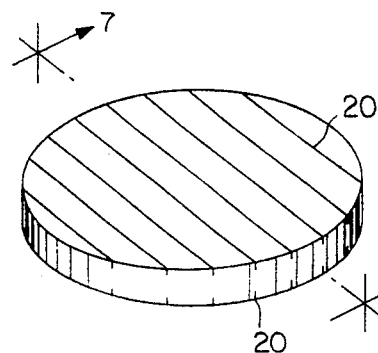
Figure 7:
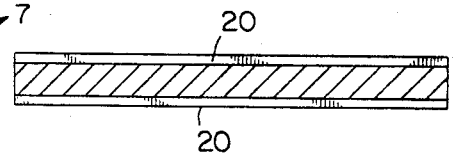
FIG. 7 is a cross-sectional view taken along line 7—7 in FIG. 6.
Figure 8:
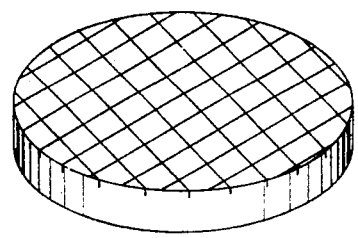
Figure 9:
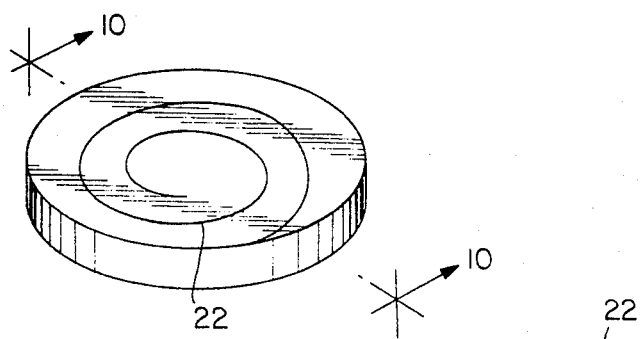
Figure 10:
FIG. 10 is a cross-sectional view taken along line 10—10 in FIG. 9.

The embodiments of FIGS. 3-5 show the surface disruption of french fries by placing cuts 22 through the full thickness of the fries at various locations. In addition to disrupting the surface of the par-fried potato pieces to achieve the advantages of the present invention, the cuts made in this manner further add an additional dimension of crispness by providing thinner areas at discrete locations which are fried to achieve a greater ratio of crispy skin to soft, mealy interior. While this does provide an added degree of crispness to the product, the advantage of the present invention does not depend upon these thinned, crisp areas.

It is an advantage of the present invention that the surface disruption can provide attractive designs in the final product. These designs can be due to the shape of the fry after cutting into particular configurations as shown in the drawings. The fried product can also be given attractive surface designs by cutting or piercing the potato in desired patterns along the surface skin. For example, the disc-shaped, dinner fry product is especially adaptable to having a trademark logo or other design imprinted in the surface by passing the potato pieces into contact with a roller having cutting means placed in a desired configuration. In addition, the potato pieces can be cut into any desired overall shape, such as in the form of alphabet letters, numbers, or common shapes such as animals or the like.

It is possible to perform the surface disruption step at any point in processing prior to finish frying. Conveniently, it can be conducted immediately after par-frying and prior to freezing, however the order of these steps can be reversed and intermediate processing steps such as partial chilling can be employed where desired to firm the texture of the potato pieces after par-frying but prior to surface disruption.

The potato pieces can be frozen and packaged in conventional manner to permit storage for extended periods of time.

Because the advantages of the present invention are achieved independent of the sequence of the surface disruption and freezing steps, it is possible for a cook to score or otherwise disrupt the surface of conventionally-prepared frozen, par-fried potato pieces directly prior to finish frying.

The potato pieces can be frozen and packaged in conventional manner to permit storage for extended periods of time.

Final preparation for serving can be by finish frying or by oven heating. Finish frying of the potato pieces can be conducted in conventional fashion, such as frying in fat or oil at a temperature within the range of from about 325° to about 400° F. Frying times according to the present invention will be within the range of from about 1 minute to about 6 minutes. Preferred frying conditions will be with an oil temperature of from about 340° to about 385° F. for from about 1 minute and 15 seconds to about 4 minutes. The frying time will of course vary with the shape of the product, its moisture content and temperature upon submersion into the hot oil.

The more rapid finish frying enabled according to the present invention provides savings in labor, energy and useable product. Because the invention can reduce the finish frying time to such a short period, the necessary inventory of finish-fried fries at any given time can be reduced. Moreover, because the fries remain crisp for extended periods of time, they remain suitable for serving longer, thus virtually eliminating wastage of product and providing a product more desirable for takeout orders where the time between purchase and consumption will vary. Additionally, because the rapid finish frying enabled according to the present invention permits the production of greater amounts of potatoes to be fried in a given time, energy and equipment savings at the point of final preparation are realized.

According to another aspect of the invention, an alternative to frying in hot oil for final preparation is provided. To achieve this the products are substantially fully fried prior to freezing, preferably such that the heating prior to serving is principally for reheating and not for further cooking the products. To substantially fully cook the products according to this aspect of the invention, the final fry time will be extended for from about 20 seconds to about 4 minutes over that which would be conventional. When properly processed in this manner, the reheating just prior to consumption need be only sufficient to bring the product to serving temperature. Any additional heating beyond this will, in fact, cause excessive browning and tend to dry the interior and reduce the desired textural contrast between the interior and exterior of the product.

Reheating of these substantially completely cooked products for consumption can be accomplished by oven heating, either of the conventional radiant type or microwave. Oven heating in a conventional radiant oven will typically require from about 1 to 6 minutes at from about 375° to about 500° F., preferably 2 to 5 minutes at from 375° to 450° F. Also, it is an unexpected advantage of the invention that, when fully fried, crisp products can be obtained by reheating in a microwave oven. When heating by microwave, the product will achieve its best crispness in from 10 seconds to about 1 minute after removing from the oven, fully heated. The exact time will depend on sample size, temperature and size of power source.

BEST MODE FOR CARRYING OUT THE PRESENT INVENTION

The following examples are provided to illustrate and explain the present invention in terms of the best modes for carrying it out. These examples are not intended to be limiting in any regard. Unless otherwise indicated, all parts and percentages are based upon the weight of the raw potato prior to frying.

EXAMPLE 1

This example illustrates the utilization of the present invention to prepare a shoestring potato product.

Idaho potatoes are washed, peeled and cut into strips ⅜ inch by ⅜ inch by conventional methods. The potato strips are then blanched for 8 minutes at 200° to 205° F. in brine, having a salt concentration of about 2%. The blanched potato pieces are removed from the blanching solution and air dried at about 175°F. for about 10 minutes to achieve a weight loss of about 15%. The potato pieces are then par-fried in hot oil at a temperature of about 350° F. for 1 minute, during which period of time a surface skin is formed over the cut surfaces of the potato pieces. The potato pieces are then scored on two opposed surfaces by slicing with a knife just through the surface skin in parallel cuts spaced about ⅜" apart. The potato pieces are then frozen. For final preparation, the frozen french fries are finish fried in oil at a temperature of about 350° F. for 1 minute and 15 seconds.

The resulting french fries remain crisp even after cooling for more than 30 minutes to essentially room temperature. This crispness has been objectively noted by an audible crunchy sound upon chewing. In addition to the retained crispiness, the salt blanching controls the color to an even light, fried color and provides a desirable level of saltiness which may eliminate the need for further salting.

EXAMPLE 2

The process of Example 1 is repeated except that the sequence of freezing and surface disruption is reversed. The products produced according to this example are essentially the same as those of Example 1.

EXAMPLE 3

The process of Example 1 is substantially repeated, with the only exception being that the blanching water is tap water not containing added salt. The texture of the resulting finish fried product is less preferred than that of Example 1, and the color is somewhat darker.

EXAMPLE 4

This example further illustrates both the color control and crispness improvement of the present invention for preparing a french fried potato product.

According to this example, potatoes are washed, peeled and cut as in Example 1, blanched for 8 minutes in tap water at a temperature of 200° to 205° F., quenched in brine having a salt concentration of about 5% and a temperature of about 75° F. for 10 minutes, and rinsed in cold tap water for 15 minutes. The potato pieces are then processed by par-frying, scoring, freezing and finish frying as set forth in Example 1. The resulting products are similar in texture and crispness retention to those in Example 1.

EXAMPLE 5

This example illustrates the preparation of homefried style potatoes with improved crispness retention according to the present invention.

The potato pieces are washed, peeled and cut into slices ⅜" thick. The potato slices are blanched for 10 minutes in water at a temperature of 200° to 205° F. The blanched potato pieces are then air dried at 175° F. for about 10 minutes to achieve a weight loss of 15%. The resulting partially-dehydrated potato pieces are then par-fried at 350° F. for 1½ minutes. The par-fried potato pieces are then scored with a knife on opposed flat surfaces by two intersecting series of parallel cuts just through the surface skin developed by par-frying, the cuts being spaced about ⅜" apart. The scored potato pieces are frozen and held for finish frying at a temperature of 350° F. for 3 minutes. The resulting dinner-fry potatoes have an unusually desirable combination of crispy surface and mealy interior, and retain this textural contrast to a significant extent even after cooling to room temperature.

EXAMPLE 6

This example repeats the procedure of Example 5, except that the potatoes are not peeled prior to cutting and instead of scoring the surface after par-frying, the necessary surface disruption is obtained by simply removing the skin from the peripheral edges of the potato slices. The products produced in this manner are similar in all respects to those produced according to Example 5.

EXAMPLE 7

For purposes of illustrating the improvement in crispness retention which can be achieved according to the present invention, a comparison is made of the invention to the prior art by using commercially-available frozen par-fried french fried potatoes as the starting materials.

These french fried potatoes were elongated strips, having an essentially square cross-section about ⅜" on a side and had a noticeable surface skin thereon, resulting from the par-frying step employed in their preparation. One portion of these potatoes was scored with a knife along two opposed surfaces of each potato piece just sufficiently to break the surface in parallel cuts spaced about ⅜" apart. This portion of fries and another portion from the same bag were combined and then immersed in a hot oil bath maintained at a temperature of 350° F. for 2 minutes. The resulting finish-fried potatoes were drained on paper toweling where they were left to stand for about 30 minutes.

The two portions of potatoes were distinguishable in appearance due to a slight darkening in the areas of the scoring. The unscored potato pieces were limp and rubbery, whereas those which had been scored after par-frying but prior to finish frying in accordance with the present invention, retained a noticeable crispy exterior apparent by an audible crunch upon biting.

EXAMPLE 8

This example illustrates the utilization of the present invention to prepare a shoestring potato with improved texture, color and flavor.

Idaho potatoes are washed, peeled and cut into strips ⅜ inch by ⅜ inch by conventional methods. The potato strips are then blanched for 8 minutes at 200° to 205° F. in water, quenched in brine having a salt concentration of about 5% for about 10 minutes and then washed in water for about 15 minutes. The potato pieces are air dried at about 175° F. for about 10 minutes to achieve a weight loss of about 15%. The potato pieces are then par-fried in hot oil at a temperature of about 350° F. for 1½ minutes. The potato pieces are then frozen. For final preparation, the frozen french fries are finish fried in oil at a temperature of about 350° F. for about 2 minutes.

EXAMPLE 9

The process of example 8 is substantially repeated, with the only exception being that the blanching water is brine and the brine quench is not performed. The texture of the resulting finish fried product is essentially the same as that of Example 8.

EXAMPLE 10

According to this example, potatoes are washed, peeled and cut as in Example 8, blanched for 5 minutes in steam, quenched in brine having a salt concentration of about 5% and a temperature of about 75° F. for 10 minutes, and rinsed in cold tap water for 15 minutes. The potato pieces are then processed by par-frying, freezing and finish frying as set forth in Example 8. The resulting products are similar in texture, flavor and crispness retention to those in Example 8.

EXAMPLE 11

The process of Example 8 is repeated, but this time slits just through the surface skin formed by par frying are made about ½ inch apart, just prior to freezing. The resulting fried potatoes are noticeably crisper than those of Example 8.

EXAMPLE 12

This example illustrates the utilization of the present invention to prepare a crispy shoestring potato by final heating in a conventional oven or a microwave oven.

Idaho potatoes are washed, peeled and cut into strips ⅜ inch by ⅜ inch by conventional methods. The potato strips are then blanched for 8 minutes at 200° to 205° F. in brine, having a salt concentration of about 2%. The blanched potato pieces are removed from the blanching solution and air dried at about 175° F. for about 10 minutes to achieve a weight loss of about 15%. The potato pieces are then par-fried in hot oil at a temperature of about 350° F. for 1 minute, during which period of time a surface skin is formed over the cut surfaces of the potato pieces. The potato pieces are then scored on two opposed surfaces by slicing with a knife just through the surface skin in parallel cuts spaced about ⅜ inch apart. For finish frying, the fries are fried in oil at a temperature of about 350° F. for 2 minutes. The product is then frozen.

For final heating, the oven temperature is set at 450° F. and a sample is heated for 5 minutes.

Using microwave energy, the sample is ready in 45 seconds.

From the oven, the resulting french fries remain crisp even after cooling for more than 10 minutes. This crispness has been objectively noted by an audible crunchy sound upon chewing. In addition to the retained crispiness, the salt blanching controls the color to an even, light, fried color and provides a desirable level of saltiness which may eliminate the need for further salting.

From the microwave oven, the product is not as crispy, but definitely acceptable.

EXAMPLE 13

The process of Example 12 is repeated except that the sequence of surface disruption is moved up to after air drying. The products produced according to this example are similar to those of Example 12, but do not retain their crispiness quite as long.

EXAMPLE 14

The process of Example 12 is substantially repeated, with the only exception being that the blanching water is tap water not containing added salt. The texture of the resulting finish fried product is less preferred than that of Example 12, and the color is somewhat darker.

EXAMPLE 15

This example further illustrates both the color control and crispness improvement of the present invention for preparing a french fried potato product.

According to this example, potatoes are washed, peeled and cut as in Example 12, blanched for 8 minutes in tap water at a temperature of 200° to 205° F., quenched in brine having a salt concentration of about 5% and a temperature of about 75° F. for 10 minutes, and rinsed in cold tap water for 15 minutes. The pieces are then air dried at about 175° F. for 10 minutes to a weight loss of about 15%. The potato pieces are then processed by par-frying, scoring, and finish frying as set forth in Example 12. The resulting products from the oven and microwave heating are similar in texture and crispness retention to those in Example 12.

EXAMPLE 16

The process of Example 15 is repeated with the exception that the potato pieces were scored/slitted after air drying. The products produced according to this technique are similar to those of Example 13.

EXAMPLE 17

This example illustrates the preparation of homefried style potatoes with improved crispness retention, which are heated for serving by conventional kitchen oven.

Potato pieces are washed, peeled and cut into slices ⅜ inch thick. The potato slices are blanched for 10 minutes in water at a temperature of 200° to 205° F. The blanched potato pieces are then air dried at 175° F. for about 10 minutes to achieve a weight loss of 15%. The resulting partially-dehydrated potato pieces are then par-fried at 350° for 1½ minutes. The par-fried potato pieces are then scored with a knife on opposed flat surfaces by two intersecting series of parallel cuts just through the surface skin developed by par-frying, the cuts being spaced about ⅜ inches apart. The scored potato pieces are finish fried at a temperature of 350° F. for 3 minutes and then frozen. For preparation in the conventional oven, the temperature is set at 450° F. and the sample is heated for 5 minutes. The resulting dinner-fry potatoes have an unusually desirable combination of crispy surface and mealy interior.

EXAMPLE 18

This example repeats the procedure of Example 17, except that the potatoes are scored/slitted after air drying. The products produced are less preferred than those of Example 17.

EXAMPLE 19

This example illustrates the utilization of the present invention to prepare a shoestring potato with improved texture.

Idaho potatoes are washed, peeled and cut into strips ⅜ inch by ⅜ inch by conventional methods. The potato strips are then blanched for 8 minutes at 200° to 205° F. in tap water. The blanched potato pieces are removed from the blanching solution and air dried at about 175° F. for about 10 minutes to achieve a weight loss of about 15%. The potato pieces are then par-fried in hot oil at a temperature of about 350° F. for 2 minutes. The potato pieces are then frozen. For final preparation, the frozen french fries are finish fried in oil at a temperature of about 350° F. for 1 minute and 15 seconds.

EXAMPLE 20

Potato strips of ⅜ inch by ⅜ inch are washed and blanched according to the normal industrial practice of using water at 190° F. for a time of two minutes to inactivate the enzymes. The strips are next air dried to attain a weight loss of 15%, then par fried in oil, frozen and finish fried as in Example 19. The interior texture is noticeably drier than Example 19.

The above description is presented for the purpose of teaching the person of ordinary skill in the art how to practice the present invention. It is not intended to describe in detail all of the obvious modifications and variations of the invention which would become apparent to the person of ordinary skill in the art upon reading. It is intended, however, to include all such modifications and variations within the scope of the invention which is defined by the following claims.

We claim:

1. A process for preparing a potato product capable of frozen storage and heating to produce a soft, mealy interior and a crisp surface which remains crisp for extended periods of time, and which comprises discrete pieces of potato having a surface skin substantially completely covering the surfaces of the potato pieces, said skin disrupted to expose the interior of the potato pieces, the process comprising: cutting a potato to form pieces, heating the potato pieces by par-frying in hot oil under conditions effective to form a skin over the outer surfaces of the potato pieces, then disrupting the outer surface skin of the potato pieces, finish frying the potato pieces and then freezing the potato pieces, the finish frying substantially fully cooking the potato pieces and enabling preparation for eating by oven heating to a degree sufficient to warm the interior of the potato pieces to expose the interior of the potato pieces.

2. A process for preparing frozen, par-fried French fry potato product capable of heating to provide a soft, mealy interior and a crisp outer crust, comprising: cutting a potato into elongated potato strips, blanching and partially drying the potato strips, par-frying the potato strips in hot oil under conditions effective to form a skin over the outer surfaces of the potato strips, freezing the par-fried potato strips and piercing the outer surface skin of the potato pieces at a plurality of locations to expose the interior of the potato pieces.

3. A process for preparing frozen, par-fried disc-shaped potato pieces capable of heating to provide a soft, mealy interior and a crisp outer crust, comprising: cutting a potato into disc-shaped potato pieces, blanching and partially drying the potato pieces, par-frying the potato pieces in hot oil under conditions effective to form a skin over the outer surfaces of the potato pieces, and piercing the outer surface skin of the disc-shaped potato pieces at a plurality of locations to expose the interior of the potato pieces.

* * * * *